United States Patent
Long et al.

(10) Patent No.: US 12,068,790 B2
(45) Date of Patent: Aug. 20, 2024

(54) OPTICAL PATH SYSTEM FOR QUANTUM COMMUNICATION AND QUANTUM COMMUNICATION METHOD

(71) Applicant: TSINGHUA UNIVERSITY, Beijing (CN)

(72) Inventors: Gui-Lu Long, Beijing (CN); Liu-Guo Yin, Beijing (CN); Ruo-Yang Qi, Beijing (CN); Hao-Ran Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 248 days.

(21) Appl. No.: 17/844,064

(22) Filed: Jun. 20, 2022

(65) Prior Publication Data

US 2022/0321234 A1 Oct. 6, 2022

Related U.S. Application Data

(63) Continuation of application No. PCT/CN2020/076326, filed on Feb. 24, 2020.

(30) Foreign Application Priority Data

Dec. 23, 2019 (CN) .......................... 201911335695.8

(51) Int. Cl.
*H04B 10/70* (2013.01)
*G01H 9/00* (2006.01)
*G02B 27/28* (2006.01)
*H04B 10/50* (2013.01)

(52) U.S. Cl.
CPC ............ *H04B 10/70* (2013.01); *G01H 9/004* (2013.01); *G02B 27/283* (2013.01); *H04B 10/506* (2013.01)

(58) Field of Classification Search
None
See application file for complete search history.

(56) References Cited

U.S. PATENT DOCUMENTS 7,457,548 B2 * 11/2008 Tomaru ................ H04B 10/70
380/255
7,613,396 B2 * 11/2009 Maeda ................. H04B 10/70
398/43

(Continued)

FOREIGN PATENT DOCUMENTS

CN 103546280 1/2014
CN 108462576 8/2018

(Continued)

OTHER PUBLICATIONS

International Search Report of PCT/CN2020/076326.

(Continued)

*Primary Examiner* — Jai M Lee

(57) ABSTRACT

Disclosed are an optical path system for quantum communication and a quantum communication method. The optical path system for quantum communication includes a light source module, an intensity and polarization modulation module, a polarization maintaining interference ring, a phase and intensity modulation module, a first isolator, a first polarization beam splitter, a second isolator, a beam splitter, a second polarization beam splitter, a second phase modulator, and a 90-degree Faraday rotator mirror. An optical signal may pass through a first polarization beam splitter, bypass a phase and intensity modulation module, and directly reach a polarization maintaining interference ring, thereby solving a problem of series mode interference in an optical signal circuit, and greatly improving a modulation speed of the circuit.

20 Claims, 4 Drawing Sheets

(56) References Cited

U.S. PATENT DOCUMENTS

| | | | | |
|---|---|---|---|---|
| 8,116,636 | B2* | 2/2012 | Youn | H04L 9/0858 |
| | | | | 398/198 |
| 9,030,731 | B2* | 5/2015 | Arahira | G02F 1/395 |
| | | | | 356/450 |
| 10,142,033 | B2* | 11/2018 | Han | H04B 10/85 |
| 2014/0233957 | A1 | 8/2014 | Watanabe | |
| 2018/0241553 | A1* | 8/2018 | Lucamarini | H04B 10/70 |
| 2019/0260478 | A1* | 8/2019 | Lucamarini | H04B 10/548 |
| 2022/0231845 | A1* | 7/2022 | Shin | H04L 9/0858 |

FOREIGN PATENT DOCUMENTS

| | | |
|---|---|---|
| CN | 108494498 | 9/2018 |
| CN | 108667519 | 10/2018 |
| CN | 108683461 | 10/2018 |
| CN | 109039474 | 12/2018 |
| CN | 208337595 | 1/2019 |
| CN | 109708852 | 5/2019 |

OTHER PUBLICATIONS

Zhen Sun et al., "Design and Implementation of a Practical Quantum Secure Direct Communication System", Conference: 2018 IEEE Globecom Workshops (GC Wkshps), Dec. 31, 2018, sections II-IV.

Ruoyang Qi et al., "Implementation and Security Analysis of Practical Quantum Secure Direct Communication" Light: Science and Applications, Feb. 6, 2019, vol. 8 No. 22.

* cited by examiner

| Test Bit | $\|s\rangle$ | |
| --- | --- | --- |
| | $\|l\rangle$ | |
| Signal Bit | $\|\theta\rangle = \dfrac{\|s\rangle + e^{i\theta}\|l\rangle}{\sqrt{2}}$ | |

FIG. 4

OPTICAL PATH SYSTEM FOR QUANTUM COMMUNICATION AND QUANTUM COMMUNICATION METHOD

CROSS-REFERENCE TO RELATED APPLICATION

The present application is a continuation application of PCT Patent Application No. PCT/CN2020/076326, entitled "OPTICAL PATH SYSTEM FOR QUANTUM COMMUNICATION AND QUANTUM COMMUNICATION METHOD", filed on Feb. 24, 2020, which claims the priority of Chinese patent application No. 201911335695.8 entitled "OPTICAL PATH SYSTEM FOR QUANTUM COMMUNICATION AND QUANTUM COMMUNICATION METHOD" filed on Dec. 23, 2019, the entire contents of which are hereby incorporated by reference in its entirety.

TECHNICAL FIELD

The present disclosure relates to the field of quantum communication, in particular to an optical path system for quantum communication and a quantum communication method.

BACKGROUND

Quantum communication refers to a novel communication manner for information transmission by taking advantage of Quantum Entanglement effects. In the quantum private communication technology, common coding manners include phase coding and polarization coding. The quantum communication based on the phase coding is a private communication manner in which information may be stably transmitted along optical fibers.

For a two-way quantum communication in the optical path system for quantum communication, an optical signal needs to return along an original path for decoding operation. However, during the transmission of the optical signal in the conventional optical path system for quantum communication, an electro-optical modulator may interfere the optical signal in a circuit, resulting in a problem of series mode interference in the optical signal circuit of the two-way quantum communication system.

SUMMARY

In view of this, the present disclosure discloses an optical path system for quantum communication. The optical path system for quantum communication includes a light source module, an intensity and polarization modulation module, a polarization maintaining interference ring, a phase and intensity modulation module, a first isolator, a first polarization beam splitter, a second isolator, a beam splitter, a second polarization beam splitter, a 90-degree Faraday rotator mirror and a second phase modulator. An input terminal of the intensity and polarization modulation module is connected with an output terminal of the light source module to perform an intensity modulation and a polarization modulation on an optical signal pulse. A first terminal of the polarization maintaining interference ring is connected with an output terminal of the intensity and polarization modulation module. An input terminal of the phase and intensity modulation module is connected with a third terminal of the polarization maintaining interference ring to perform a phase modulation and an intensity modulation on the optical signal pulse from the polarization maintaining interference ring. An input terminal of the first isolator is connected with an output terminal of the phase and intensity modulation module. A first terminal of the first polarization beam splitter is connected with an output terminal of the first isolator. An input terminal of the second isolator is connected with a third terminal of the first polarization beam splitter, and an output terminal of the second isolator is connected with a fourth terminal of the polarization maintaining interference ring.

A first terminal of the beam splitter is connected with a second terminal of the first polarization beam splitter by a communication channel. A first terminal of the second polarization beam splitter is connected with a third terminal of the beam splitter. A first terminal of the second phase modulator is connected with a second terminal of the second polarization beam splitter. A first terminal of the 90-degree Faraday rotator mirror is connected with a second terminal of the second phase modulator. A second terminal of the 90-degree Faraday rotation mirror is connected with a third terminal of the second polarization beam splitter.

In an embodiment, the optical path system for quantum communication further includes a first single photon detector. The first single photon detector is connected with a second terminal of the polarization maintaining interference ring.

In an embodiment, the optical path system for quantum communication further includes a second single photon detector. The second single photon detector is connected with a second terminal of the beam splitter.

In an embodiment, the optical path system for quantum communication further includes an optical circulator. A first terminal of the optical circulator is connected with the output terminal of the intensity and polarization modulation module, and a second terminal of the optical circulator is connected with the first terminal of the polarization maintaining interference ring.

In an embodiment, the optical path system for quantum communication further includes a third single photon detector. The third single photon detector is connected with a third terminal of the optical circulator.

In an embodiment, the intensity and polarization modulation module includes a variable optical attenuator, a polarization modulator and a third polarization beam splitter. An input terminal of the variable optical attenuator is connected with the output terminal of the light source module. An input terminal of the polarization modulator is connected with an output terminal of the variable optical attenuator. An input terminal of the third polarization beam splitter is connected with an output terminal of the polarization modulator. An output terminal of the third polarization beam splitter is connected with the first terminal of the optical circulator.

In an embodiment, the phase and intensity modulation module includes a first phase modulator. An input terminal of the first phase modulator is connected with the third terminal of the polarization maintaining interference ring, and an output terminal of the first phase modulator is connected with the input terminal of the first isolator.

In an embodiment, the phase and intensity modulation module further includes an intensity modulator. An input terminal of the intensity modulator is connected with the output terminal of the first phase modulator, and an output terminal of the intensity modulator is connected with the input terminal of the first isolator.

In an embodiment, the optical path system for quantum communication further includes a polarization maintaining optical fiber. The light source module, the intensity and polarization modulation module, the polarization maintaining interference ring, the phase and intensity modulation module, the first isolator and the first polarization beam splitter are connected by the polarization maintaining optical fiber.

In an embodiment, the present disclosure provides a quantum communication method, including:

providing, by a receiving end, an optical signal pulse, and performing an intensity modulation and a polarization modulation on the optical signal pulse;

dividing an intensity modulated and polarization modulated optical signal pulse into a first optical signal pulse and a second optical signal pulse, the second optical signal pulse having a time delay with respect to the first optical signal pulse;

performing phase modulations and intensity modulations on the first optical signal pulse and the second optical signal pulse, respectively, and transmitting phase modulated and intensity modulated first optical signal pulse and second optical signal pulse to a transmitting end via a communication channel;

dividing the first optical signal pulse transmitted to the transmitting end into a first detection optical signal and a second optical signal, and dividing the second optical signal pulse transmitted to the transmitting end into a third detection optical signal and a fourth optical signal;

performing a safety detection based on the first detection optical signal, and dividing the second optical signal into two second sub-optical signals;

performing a safety detection based on the third detection optical signal, and dividing the fourth optical signal into two fourth sub-optical signals;

sequentially performing a phase modulation and a 90-degree polarization state rotation on one of the two second sub-optical signals to form a first sub-detection optical signal; sequentially performing a 90-degree polarization state rotation and a phase modulation on another of the two second sub-optical signals to form a second sub-detection optical signal; and combining the first sub-detection optical signal and the second sub-detection optical signal to form a first detection optical signal pulse;

sequentially performing a phase modulation and a 90-degree polarization state rotation on one of the two fourth sub-optical signals to form a third sub-detection optical signal; sequentially performing a 90-degree polarization state rotation and a phase modulation on another of the fourth sub-optical signals to form a fourth sub-detection optical signal; and combining the third sub-detection optical signal and the fourth sub-detection optical signal to form a second detection optical signal pulse; and transmitting the first detection optical signal pulse and the second detection optical signal pulse to the receiving end via the communication channel for detection, and decoding phase codes of the transmitting end.

In an embodiment, the performing intensity modulations on the first optical signal pulse and the second optical signal pulse, respectively, includes eliminating the first optical signal pulse, and keeping the second optical signal pulse unchanged.

In an embodiment, the performing intensity modulations on the first optical signal pulse and the second optical signal pulse, respectively, includes keeping the first optical signal pulse unchanged, and eliminating the second optical signal pulse.

In an embodiment, the performing intensity modulations on the first optical signal pulse and the second optical signal pulse, respectively, includes eliminating an intensity of the first optical signal pulse by half, and eliminating an intensity of the second optical signal pulse by half.

In an embodiment, the performing phase modulations on the first optical signal pulse and the second optical signal pulse, respectively, includes keeping a phase of the second optical signal pulse unchanged.

In an embodiment, the performing phase modulations on the first optical signal pulse and the second optical signal pulse, respectively, includes changing a phase of the first optical signal pulse by $\Pi$.

In an embodiment, the performing phase modulations on the first optical signal pulse and the second optical signal pulse, respectively, includes changing a phase of the second optical signal pulse by $\Pi$.

In an embodiment, performing phase modulations on the two second sub-optical signals includes keeping a phase of each of the two second sub-optical signals unchanged.

In an embodiment, performing phase modulations on the two second sub-optical signals includes changing a phase of each of the two second sub-optical signals by $\Pi$.

In an embodiment, performing phase modulations on the two fourth sub-optical signals includes keeping a phase of each of the two fourth sub-optical signals unchanged.

In an embodiment, performing phase modulations on the two fourth sub-optical signals includes changing a phase of each of the two fourth sub-optical signals by $\Pi$.

The present disclosure provides the optical path system for quantum communication and the quantum communication method. For the optical path system for quantum communication, the optical signal pulse is transmitted from the light source at the receiving end, and after the intensity and polarization modulations are performed on the optical signal pulses, the optical signal pulse is divided into two pulses by the polarization maintaining interference (PMI) ring, namely a first optical signal pulse (i.e., a front pulse) and a second optical signal pulse (i.e., an after pulse). The phase modulation and the intensity modulation are performed on the first optical signal pulse (the front pulse) and the second optical signal pulse (the after pulse) are by the phase and intensity modulation module, which may be understood to be a pre-process of the signal pulse. After that, the pre-processed signal pulses are transmitted to the transmitting end via the communication channel.

After reaching the transmitting end, the phase modulated and intensity modulated first optical signal pulse (the front pulse) and the second optical signal pulse (the after pulse) are split by the beam splitter into optical signals. Partial optical signals (including a first detection optical signal and a third detection optical signal) are used for safety detection. An phase encoding operation is performed on the remaining optical signals (including the second optical signal and the fourth optical signal) when the remaining optical signals pass through the second polarization beam splitter, the Faraday rotation mirror, and the second phase modulator in different directions along a loop (which includes the second phase modulator, the second polarization beam splitter and the 90-degree Faraday rotator mirror), to form a first detection optical signal pulse and a second detection optical signal pulse, which are transmitted to the receiving end via the communication channel afterwards.

After reaching the receiving end, the first detection optical signal pulse and the second detection optical signal pulse may pass through the first polarization beam splitter, bypass the phase and intensity modulation module (including the intensity modulator and the phase modulator) and directly reach the PMI ring. Based on the differences of the phase pre-modulations at the receiving end and the phase codes at the transmitting end, the first detection optical signal pulse and the second detection optical signal pulse may be transmitted from a first terminal (port 1) or a second terminal (port 2) of the PMI ring, respectively, to reach different single photon detectors. At this time, the phase codes of the optical pulses of the transmitting end may be decoded by the receiving end based on responses of different single photon detectors and the pre-modulation of the optical pulses, thereby realizing quantum communication.

Therefore, at the transmitting end, while passing through the second polarization beam splitter and passing through the loop simultaneously in two different directions, the remaining optical signals (including the second optical signal and the fourth optical signal) are coded by the second phase modulator and processed by the second polarization beam splitter and the 90-degree Faraday rotator mirror, so that, there is a difference of 90 degree between the polarization of the obtained optical signals (including the first detection light signal pulse and the second detection light signal pulse) returning to the receiving end and the polarization of the optical signal transmitted from the receiving end, so that the optical signals (including the first detection light signal pulse and the second detection light signal pulse) may pass through the first polarization beam splitter, bypass the phase and intensity modulation module (including the intensity modulator and the phase modulator) and directly reach the PMI ring, thereby solving the problem of series mode interference in an optical signal loop, and improving the modulation speed of the circuit greatly.

BRIEF DESCRIPTION OF THE DRAWINGS

In order to more clearly illustrate the technical solutions in the embodiments of the present disclosure or in the related art, the drawings required for the description of the embodiments or of the related art will be briefly described below. It is obvious that the drawings in the following description are merely embodiments of the present disclosure. For those of ordinary skill in the art, without creative efforts, other drawings may also be obtained according to the disclosed drawings.

FIG. 4 is a schematic diagram illustrating pre-modulated optical signals in the optical path system for quantum communication according to the present disclosure.

DETAILED DESCRIPTION OF THE EMBODIMENTS

The technical solutions in the embodiments of the present disclosure are clearly and completely described below with reference to the accompanying drawings in the embodiments of the present disclosure. It is obvious that, the described embodiments are merely some embodiments of the present disclosure, rather than all embodiments. All other embodiments obtained by those of ordinary skill in the art based on the embodiments of the present disclosure without creative efforts shall fall within the protection scope of the present disclosure.

To make the objectives, technical solutions and advantages of the present disclosure clearer and better understood, the present disclosure is further described in detail below based on the embodiments combining with the accompanying drawings. It should be understood that the specific embodiments described herein are merely used to explain the present disclosure, but not intended to limit the present disclosure.

Figure 1:
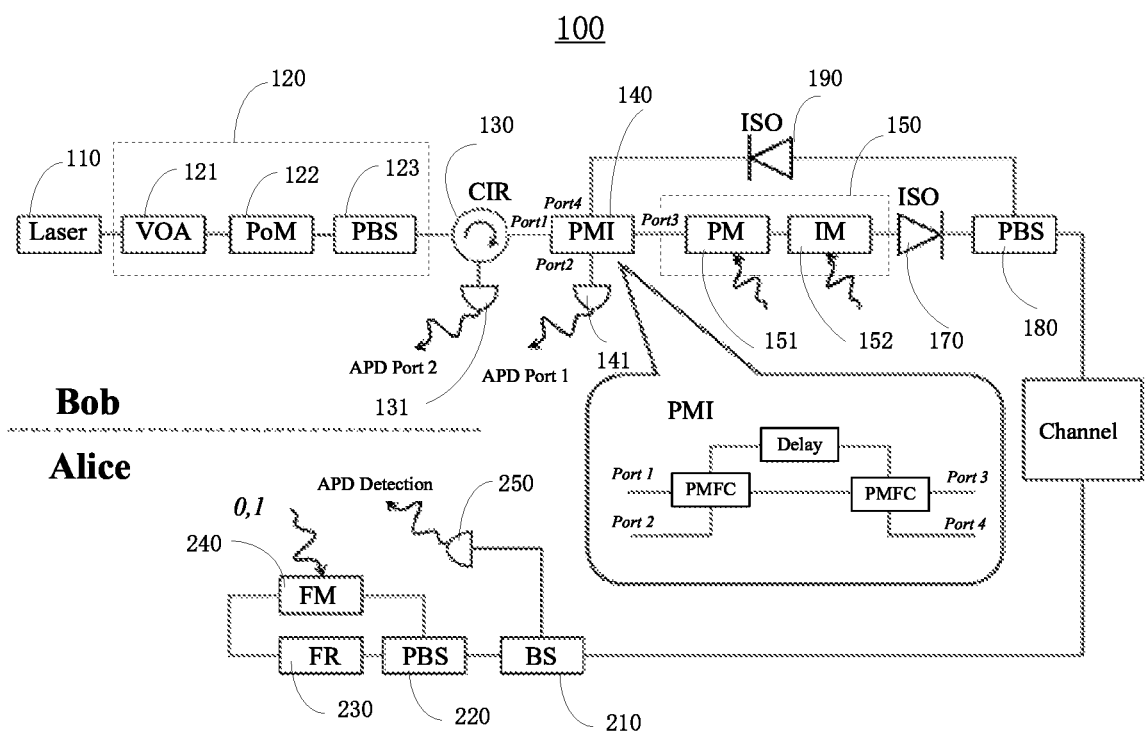
FIG. 1 is a schematic diagram illustrating an optical path system for quantum communication according to the present disclosure.
Figure 2:
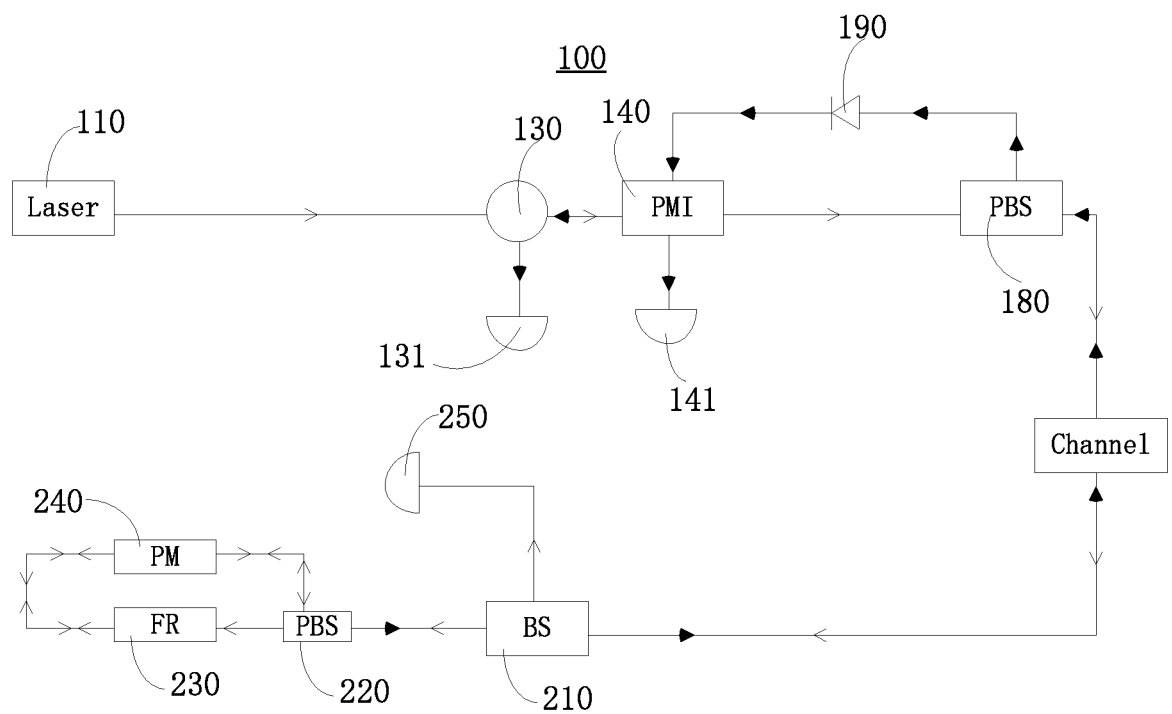
FIG. 2 is a schematic diagram illustrating flows of optical signals in the optical path system for quantum communication according to the present disclosure.
Figure 3:
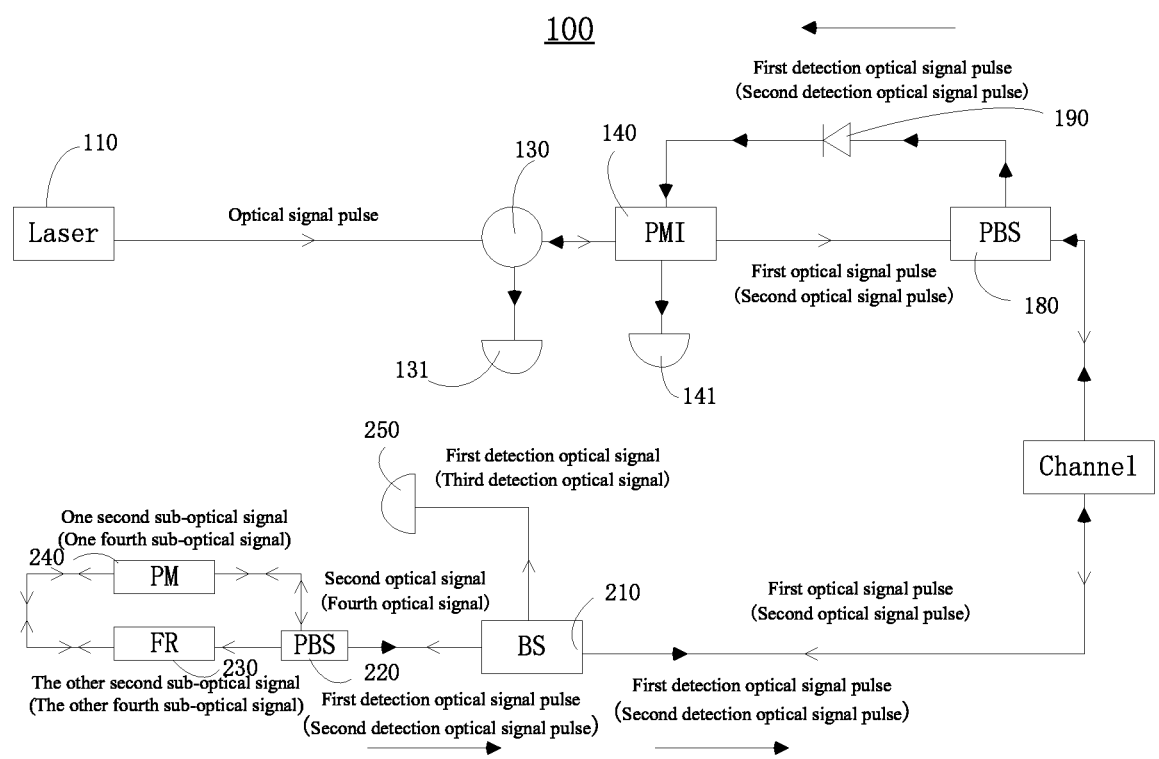
FIG. 3 is a schematic diagram illustrating conversions of optical signals in the optical path system for quantum communication according to the present disclosure.

Referring to FIGS. 1 to 3, the present disclosure provides an optical path system for quantum communication 100. The optical path system for quantum communication 100 includes a light source module 110, an intensity and polarization modulation module 120, a polarization maintaining interference ring 140, a phase and intensity modulation module 150, a first isolator 170, a first polarization beam splitter 180, a second isolator 190, a beam splitter 210, a second polarization beam splitter 220, a 90-degree Faraday rotator mirror 230, and a second phase modulator 240. An input terminal of the intensity and polarization modulation module 120 is connected with an output terminal of the light source module 110 to perform intensity modulation and polarization modulation on an optical signal pulse. A first terminal of the polarization maintaining interference ring 140 is connected with an output terminal of the intensity and polarization modulation module 120. An input terminal of the phase and intensity modulation module 150 is connected with a third terminal of the polarization maintaining interference ring 140 to perform a phase modulation and an intensity modulation on the optical signal pulse from the polarization maintaining interference ring 140. An input terminal of the first isolator 170 is connected with an output terminal of the phase and intensity modulation module 150. A first terminal of the first polarization beam splitter 180 is connected with an output terminal of the first isolator 170. An input terminal of the second isolator 190 is connected with a third terminal of the first polarization beam splitter 180, and an output terminal of the second isolator 190 is connected with a fourth terminal of the polarization maintaining interference ring 140.

A first terminal of the beam splitter 210 is connected with a second terminal of the first polarization beam splitter 180 via a communication channel. A first terminal of the second polarization beam splitter 220 is connected with a third terminal of the beam splitter 210. A first terminal of the second phase modulator 240 is connected with a second terminal of the second polarization beam splitter 220. A first terminal of the 90-degree Faraday rotator mirror 230 is connected with a second terminal of the second phase modulator 240. A second terminal of the 90-degree Faraday rotation mirror 230 is connected with a third terminal of the second polarization beam splitter 220.

In the present embodiment, at a receiving end (Bob), the light source module 110 is configured to transmit an optical signal pulse. The input terminal of the intensity and polarization modulation module 120 is connected with the output terminal of the light source module 110 to perform the intensity modulation and the polarization modulation on the optical signal pulse. The first terminal of the polarization maintaining interference ring 140 is connected with the output terminal of the intensity and polarization modulation module 120 to divide the optical signal pulses passing through the intensity and polarization modulation module 120 into a first optical signal pulse and a second optical signal pulse. The second optical signal pulse has a time delay with respect to the first optical signal pulse. The input terminal of the phase and intensity modulation module 150 is connected with the third terminal of the polarization maintaining interference ring 140 to perform phase modulation and intensity modulation on the first optical signal pulse and the second optical signal pulse. The input terminal of the first isolator 170 is connected with the output terminal of the phase and intensity modulation module 150 to block a transmission direction of the intensity-modulated first optical signal pulse and second optical signal pulse, so that the light path is unidirectional.

The first optical signal pulse and the second optical signal pulse from the first isolator 170 unidirectionally pass through the first polarization beam splitter 180, and then are transmitted to the beam splitter 210 at a transmitting end (Alice) via the communication channel. The first terminal of the beam splitter 210 is connected with the second terminal of the polarization beam splitter 180 to divide the first optical signal pulse, which passes through the polarization beam splitter 180 and is transmitted via the channel, into a first detection optical signal and a second optical signal, and to divide the second optical signal pulse, which passes through the polarization beam splitter 180 and is transmitted via the channel, into a third detection optical signal and a fourth optical signal.

The first terminal of the second polarization beam splitter 220 is connected with the third terminal of the beam splitter 210, and the second polarization beam splitter 220 is configured to split the second optical signal into two second sub-optical signals and to split the fourth optical signal into two fourth sub-optical signals. One of the two second sub-optical signals is transmitted to the third terminal of the second polarization beam splitter 220 sequentially through the second phase modulator 240 and the 90-degree Faraday rotator mirror 230 to form a first sub-detection optical signal. Another of the two second sub-optical signals is transmitted to the second terminal of the second polarization beam splitter 220 sequentially through the 90-degree Faraday rotator mirror 230 and the second phase modulator 240 to form a second sub-detection optical signal. The first sub-detection optical signal and the second sub-detection optical signal are combined by the second polarization beam splitter 220 to form a first detection optical signal pulse.

One of the two fourth sub-optical signals is transmitted to the third terminal of the second polarization beam splitter 220 sequentially through the second phase modulator 240 and the 90-degree Faraday rotator mirror 230 to form a third sub-detection optical signal. Another of the two fourth sub-optical signals is transmitted to the second terminal of the second polarization beam splitter 220 sequentially through the 90-degree Faraday rotator mirror 230 and the second phase modulator 240 to form a fourth sub-detection optical signal. The third sub-detection optical signal and the fourth sub-detection optical signal are combined by the second polarization beam splitter 220 to form a second detection optical signal pulse.

The first detection optical signal pulse is transmitted to the second terminal of the first polarization beam splitter 180 via the channel after passing through the beam splitter 210, and is further transmitted to the polarization maintaining interference ring 140 for detection after sequentially passing through the first polarization beam splitter 180 and the second isolator 190.

The second detection optical signal pulse is transmitted to the second terminal of the first polarization beam splitter 180 via the channel after passing through the beam splitter 210, and is further transmitted to the polarization maintaining interference ring 140 for detection after sequentially passing through the first polarization beam splitter 180 and the second isolator 190.

The second isolator 190 is configured to block a transmission direction, so that the optical path is unidirectional.

Therefore, for the optical path system for quantum communication 100, the optical signal pulse is transmitted from the light source at the receiving end, and after the intensity and polarization modulations are performed on the optical signal pulses, the optical signal pulse is divided into two pulses by the polarization maintaining interference (PMI) ring 140, namely a first optical signal pulse (i.e., a front pulse) and a second optical signal pulse (i.e., an after pulse). The phase modulation and the intensity modulation are performed on the first optical signal pulse (the front pulse) and the second optical signal pulse (the after pulse) are by the phase and intensity modulation module, which may be understood to be a pre-process of the signal pulse. After that, the pre-processed signal pulses are transmitted to Alice via the communication channel.

After reaching Alice, the phase modulated and intensity modulated first optical signal pulse (the front pulse) and the second optical signal pulse (the after pulse) are split by the beam splitter 210 into optical signals. Partial optical signals (including a first detection optical signal and a third detection optical signal) are used for safety detection. An phase encoding operation is performed on the remaining optical signals (including the second optical signal and the fourth optical signal) when the remaining optical signals pass through the second polarization beam splitter 220, the Faraday rotation mirror, and the second phase modulator in different directions along a loop (which includes the second phase modulator 240, the second polarization beam splitter 220 and the 90-degree Faraday rotator mirror 230), to form a first detection optical signal pulse and a second detection optical signal pulse, which are transmitted to Bob via the communication channel afterwards.

After reaching Bob, the first detection optical signal pulse and the second detection optical signal pulse may pass through the first polarization beam splitter 180, bypass the phase and intensity modulation module 150 (including the intensity modulator 152 and the phase modulator 151) and directly reach the PMI ring 140. Based on the differences of the phase pre-modulations at the receiving end and the phase codes at the transmitting end, the first detection optical signal pulse and the second detection optical signal pulse may be transmitted from a first terminal (port 1) or a second terminal (port 2) of the PMI ring 140, respectively, to reach different single photon detectors. At this time, the phase codes of the optical pulses of Alice may be decoded by Bob based on responses of different single photon detectors and the pre-modulation of the optical pulses, thereby realizing quantum communication.

Therefore, at the transmitting end, while passing through the second polarization beam splitter 220 and passing through the loop simultaneously in two different directions, the remaining optical signals (including the second optical signal and the fourth optical signal) are coded by the second phase modulator 240 and processed by the second polarization beam splitter 220 and the 90-degree Faraday rotator mirror 230, so that there is a difference of 90 degree between the polarization of the obtained optical signals (including the first detection light signal pulse and the second detection light signal pulse) returning to Bob and the polarization of the optical signal transmitted from Bob, so that the optical signals (including the first detection light signal pulse and the second detection light signal pulse) may pass through the first polarization beam splitter 180, bypass the phase and intensity modulation module 150 (including the intensity modulator 152 and the phase modulator 151) and directly reach the PMI ring 140, thereby solving the problem of series mode interference in an optical signal loop, and improving the modulation speed of the circuit greatly.

In an embodiment, the optical path system for quantum communication 100 further includes a first single photon detector 141, a second single photon detector 250, an optical circulator 130 and a third single photon detector 131. The first single photon detector 141 is connected with a second terminal of the polarization maintaining interference ring 140. The second single photon detector 250 is connected with a second terminal of the beam splitter 210. A first terminal of the optical circulator 130 is connected with the output terminal of the intensity and polarization modulation module 120, and a second terminal of the optical circulator 130 is connected with the first terminal of the polarization maintaining interference ring 140. The third single photon detector 131 is connected with a third terminal of the optical circulator 130.

In the embodiment, the first single photon detector 141, the second single photon detector 250 and the third single photon detector 131 are configured for an avalanche photo diode (APD) detection. The second single photon detector 250 is connected with the second terminal of the beam splitter 210, and is configured to perform security detection on the partial optical signals, which are obtained by the beam splitter 210 by splitting the optical signal transmitted from Bob and transmitted to Alice via the communication channel. The first single photon detector 141 is connected to the second terminal of the polarization maintaining interference ring 140, and the third single photon detector 131 is connected to the third terminal of the optical circulator 130. The first single photon detector 141 and the third single photon detector 131 are configured to detect the optical signals respectively transmitted from the first port or the second port of the PMI ring 140, which are transmitted from Alice to the Bob passing the communication channel, bypassing the phase and intensity modulation module 150 (including the intensity modulator 152 and the phase modulator 151), and directly reaching the PMI ring 140.

In this case, the safety detection of the optical path system for quantum communication 100 may be performed at the transmitting end, while the decoding and the safety capacity analysis may be performed at the receiving end. The number of particles of the front and after pulses of the optical signal are used as orthogonal basis vectors for detecting safety, and a relative phase of the front and after pulses is used as a carrier for loading codes.

In an embodiment, the intensity and polarization modulation module 120 includes a variable optical attenuator 121, a polarization modulator 122, a third polarization beam splitter 123. An input terminal of the variable optical attenuator 121 is connected with the output terminal of the light source module 110. An input terminal of the polarization modulator 122 is connected with an output terminal of the variable optical attenuator 121. An input terminal of the third polarization beam splitter 123 is connected with an output terminal of the polarization modulator 122. An output terminal of the third polarization beam splitter 123 is connected with the first terminal of the optical circulator 130.

The variable optical attenuator 121 (VOA) realizes a real-time control of the signal by attenuating the optical transmission power. The polarization modulator 122 (PoM) may realize optical polarization modulation.

In an embodiment, the phase and intensity modulation module 150 includes a first phase modulator 151 and an intensity modulator 152. An input terminal of the first phase modulator 151 is connected with the third terminal of the polarization maintaining interference ring 140. An input terminal of the intensity modulator 152 is connected with an output terminal of the first phase modulator 151.

In an embodiment, the optical path system for quantum communication 100 further includes a polarization maintaining optical fiber. The light source module 110, the intensity and polarization modulation module 120, the polarization maintaining interference ring 140, the phase and intensity modulation module 150, the first isolator 170 and the first polarization beam splitter 180 are connected via the polarization maintaining optical fiber.

Referring to FIGS. 2 and 3, in an embodiment, the present disclosure provides a quantum communication method, including following steps S10-S90.

At step S10, an optical signal pulse is provided by a receiving end, and an intensity modulation and a polarization modulation are performed on the optical signal pulse.

At step S20, an intensity modulated and polarization modulated optical signal pulse is divided into a first optical signal pulse and a second optical signal pulse, and the second optical signal pulse has a time delay with respect to the first optical signal pulse.

At step S30, phase modulations and intensity modulations are performed on the first optical signal pulse and the second optical signal pulse, respectively, and phase modulated and intensity modulated first optical signal pulse and second optical signal pulse are transmitted to a transmitting end via a communication channel.

At step S40, the first optical signal pulse transmitted to the transmitting end is divided into a first detection optical signal and a second optical signal, and the second optical signal pulse transmitted to the transmitting end is divided into a third detection optical signal and a fourth optical signal.

At step S50, a safety detection is performed based on the first detection optical signal, and the second optical signal is divided into two second sub-optical signals.

At step S60, a safety detection is performed based on the third detection optical signal, and the fourth optical signal is divided into two fourth sub-optical signals.

At step S70, a phase modulation and a 90-degree polarization state rotation are sequentially performed on one of the two second sub-optical signals to form a first sub-detection optical signal, and a 90-degree polarization state rotation and a phase modulation are sequentially performed on another of the two second sub-optical signals to form a second sub-detection optical signal, and the first sub-detection optical signal and the second sub-detection optical signal are combined to form a first detection optical signal pulse.

At step S80, a phase modulation and a 90-degree polarization state rotation are sequentially performed on one of the two fourth sub-optical signals to form a third sub-detection optical signal, and a 90-degree polarization state rotation and a phase modulation are sequentially performed on another of the two fourth sub-optical signals to form a fourth sub-detection optical signal, and the third sub-detection optical signal and the fourth sub-detection optical signal are combined to form a second detection optical signal pulse.

At step S90, the first detection optical signal pulse and the second detection optical signal pulse are transmitted to the receiving end via the communication channel for detection, and the phase codes of the transmitting end is decoded.

At the step S10, optical signal pulses may be transmitted from the receiving end by a pulse laser triggered at a frequency of 32 MHz. Meanwhile, a trigger signal is used as a trigger clock signal for an electro-optical modulator and the single photon detector at the receiving end. The intensity modulation and polarization modulation are performed on the optical signal pulse when the optical signal pulse sequentially passes through the variable optical attenuator 121, the polarization modulator 122 and the third polarization beam splitter 123.

At the step S20, after passing through the third polarization beam splitter 123, the optical signal pulse is modulated by the polarization maintaining interference (PMI) ring 140 having an arm length difference of 3 meters, to obtain a front pulse and an after pulse, that is, the first optical signal pulse and the second optical signal pulse, which have a time difference of about 15 nanoseconds. At this time, the second optical signal pulse has a time delay with respect to the first optical signal pulse. In addition, a polarization maintaining fiber coupler (PMFC) in the PMI ring 140 is a polarization maintaining beam splitter of 50:50.

At the step S30, the first optical signal pulse and the second optical signal pulse are respectively modulated by the intensity modulator 152 according to a required pre-processing. Specifically, the required pre-processing may be keeping the intensity unchanged, eliminating the intensity by half, or eliminating the intensity completely. Accordingly, the first optical signal pulse is eliminated, and the second optical signal pulse keeps unchanged, and a corresponding information code is 0. Alternatively, the second optical signal pulse is eliminated, and the first optical signal pulse keeps unchanged, and a corresponding information code is 1. Alternatively, the intensity of the first optical signal pulse is eliminated by half, and the intensity of the second optical signal pulse is eliminated by half, and the corresponding information code is 0.

Afterwards, the first optical signal pulse and the second optical signal pulse are respectively modulated by the first phase modulator 151 according to the required preprocessing. Specifically, the required pre-processing may be changing a phase by Π or unchanging the phase. Accordingly, the phase of the second optical signal pulse keeps unchanged, i.e., the phase is unchanged, and a corresponding information code is 0. Alternatively, the phase of the first optical signal pulse is changed by Π, or the phase of the second optical signal pulse is changed by Π, that is, the relative phase is changed, and a corresponding information code is 0.

At the receiving end, the first optical signal pulse and the second optical signal pulse are pre-modulated to the front pulse and the after pulse, the relative phase of which is adjustable, and are transmitted to the transmitting end (Alice) via the communication channel.

At the step S40, after transmitted to Alice, the first optical signal pulse is split into a first detection optical signal and a second optical signal by the beam splitter 210, and the second optical signal pulse is split into a third detection optical signal and a fourth optical signal. At this time, partial optical signals (including the first detection optical signal and the third detection optical signal) are separated from the beam splitter 210. A safety detection is performed on the detection signals (including the first detection optical signal and the third detection optical signal) by using the single photon detector 250, and the trigger signal is used as a clock signal to synchronize with the phase modulator at the transmitting end.

At the steps S50 and S60, the second optical signal is split into two second sub-optical signals, and the fourth optical signal is split into two fourth sub-optical signals by the second polarization beam splitter 220.

At the step S70, the phase modulation and the 90-degree polarization state rotation are performed on one of the two second sub-optical signals sequentially to form the first sub-detection optical signal. The 90-degree polarization state rotation and the phase modulation are performed on the other of the second sub-optical signals sequentially to form the second sub-detection optical signal. The first sub-detection optical signal is combined with the second sub-detection optical signal to form the first detection optical signal pulse.

At the step S80, the phase modulation and the 90-degree polarization state rotation are performed on one of the two fourth sub-optical signals to form the third sub-detection optical signal. The 90-degree polarization state rotation and the phase modulation are performed on the other one of the fourth sub-optical signals to form the fourth sub-detection optical signal. The third sub-detection optical signal is combined with the fourth sub-detection optical signal to form the second detection optical signal pulse.

When the phase modulation is performed by the second phase modulator 240, phases of the two second sub-optical signals keep unchanged, or the phases of the two second sub-optical signals are changed by Π. In this case, the remaining optical signals, including the two second sub-optical signals, are separated by the beam splitter 210 from the first optical signal pulse transmitted to Alice. The information code corresponding to not changing the phases is 0, and the information code corresponding to changing the phases by Π is 1.

When the phase modulation is performed by the second phase modulator 240, phases of the two fourth sub-optical signals keep unchanged, or the phases of the two fourth sub-optical signals are changes by Π. In this case, the remaining optical signals, including the two fourth sub-optical signals, are separated by the beam splitter 210 from the second optical signal pulse transmitted to Alice. The information code corresponding to not changing the phases is 0, and the information code corresponding to changing the phases by Π is 1.

Therefore, by means of the loop including the second phase modulator 240, the second polarization beam splitter 220 and the 90-degree Faraday rotator mirror 230, two kinds of modulations are performed on the relative phase of the front and the after pulses (namely the first optical signal pulse and the second optical signal pulse) transmitted to Alice.

At this time, a phase encoding operation is performed on the remaining optical signals passing through the Faraday rotator mirror and the second phase modulator in different directions along the loop (including the second phase modulator 240, the second polarization beam splitter 220 and the 90-degree Faraday rotator mirror 230). After the remaining optical signals pass through the loop, the optical signals are combined by the second polarization beam splitter 220 to form the first detection optical signal pulse and the second detection optical signal pulse. Afterwards, the first detection optical signal pulse and the second detection optical signal pulse are transmitted to Bob via the communication channel.

At the step S90, after being transmitted to the receiving end (Bob) via the communication channel, the first detection optical signal pulse and the second detection optical signal pulse pass through the first polarization beam splitter 180, bypass the intensity modulator 152 and the phase modulator 151, and directly reach the PMI ring 140. In the PMI ring 140, the first PMFC divides the first detection optical signal pulse and the second detection optical signal pulse (the front and after pulses) returning from Alice into two paths. The first detection optical signal pulse (the front pulse) which passes through an optical fiber longer by three meters, and the second detection optical signal pulse (the after pulse) reach the second PMFC simultaneously. At this time, according to the relative phase of 0 or Π of the first detection optical signal pulse (the front pulse) and the second detection optical signal pulse (the after pulse), at the output (port 1 or port 2), an interference in one path is eliminated or reinforced, and an interference in another path is reinforced or eliminated. Therefore, according to differences of the phase pre-modulation at the receiving end and the phase code of Alice, the first detection optical signal pulse and the second detection optical signal pulse may be transmitted from the first port (port 1) or the second port (port 2) of the PMI ring 140 to reach different single photon detectors.

In this case, it can be understood that, the information code being 0 or the information code being 1 correspond to transmitting from the port 1 or the port 2 to reach a third single photon detector 131 and a first single photon detector 141 for detection. At this time, based on responses of the third single photon detector 131 and of the first single photon detector 141 and the pre-modulation of the optical pulses at the receiving end, an XOR operation is performed on two corresponding information, and the codes of the optical pulse of Alice are decoded, thereby realizing quantum communication.

In an embodiment, the above steps S10-S90 are performed repeatedly at a frequency of 32 MHz. Communication is performed for a period of time, and both Alice and Bob record the result detected by the detectors. Bob issues the pre-modulation and a time point of the corresponding detection signal, and the pre-modulations and detection results of a portion of the coded signals, and Alice issues the detection result of the corresponding detection signal, and the modulation information code of the coded signal at the corresponding time point, then both Bob and Alice may calculate the safety capacity of the channel, and finally may successfully share a secret key according to a pre-agreed key extraction manner.

Therefore, according to the optical path system for quantum communication 100 and the quantum communication method in the above embodiments, the problems of a high bit error rate, requiring a real-time compensation and pulse serial mode interference in the circuit in a series of quantum communication protocols can be solved, so that the quantum communication system can operate more stably, accurately and at high speed. Moreover, as a new optical path system developed in a quantum safety direct communication protocol DL04, the optical path system for quantum communication 100 can realize a deterministic key transmission and a direct information transmission function in the quantum circuit.

Referring to FIG. 4, in an embodiment, the optical signal pre-modulated by the optical path system for quantum communication is illustrated. In this case, quantum states of the pre-modulated optical signal are shown in FIG. 4. A Test Bit includes only the front pulse S or only the after pulse L. A signal bit is the one in which the intensity of the front pulse S and the intensity of the after pulse L are reduced by half, and the relative phase thereof may be set as 0 or Π.

The technical features of the embodiments described above can be combined arbitrarily, and for the sake of brevity, not all possible combinations of the technical features in the above embodiments are described. However, as long as the combinations of these technical features do not contradict each other, it shall be considered as being within the scope of the present specification.

The above embodiments merely illustrate several examples of the present disclosure, and the description thereof is more specific and detailed, but is not intended to limit the scope of the present disclosure. It should be noted that, for those ordinary skill in the art, various modifications and improvements can be made without departing from the concept of the present disclosure, and these modifications and improvements are all within the protection scope of the present disclosure. Therefore, the protection scope of the present application shall be subject to the appended claims.

Finally, it should be noted that, in this context, relational terms, such as first and second, etc. are merely used to distinguish one entity or operation from another, without necessarily requiring or implying any such actual relationship or order between these entities or operations. Moreover, the terms "comprising" "including" or any other variation thereof, are intended to cover a non-exclusive inclusion, such that a process, method, article, or apparatus that includes a series of elements not only includes those elements, but also includes other elements not expressly listed, or elements inherent to the process, the method, the article, or the apparatus. In the absence of more restrictions, an element defined by the phrase "including one" does not exclude the presence of additional identical elements in the process, the method, the article, or the apparatus.

Various embodiments in the present specification are described in a progressive manner, and each embodiment focuses on differences from other embodiments, and the same or similar parts between various embodiments may be referred from each other.

The above description of the disclosed embodiments enables those ordinary skill in the art to realize or use the present disclosure. Various modifications to these embodiments will be obvious to those ordinary skill in the art, and the general principles defined herein may be implemented in other embodiments without departing from the spirit or scope of the present disclosure. Therefore, the present disclosure shall not be limited to these embodiments herein but shall be interpreted as the widest scope of the principles and novel features disclosed herein.

What is claimed is:

1. An optical path system for quantum communication, comprising:
   a light source module configured to transmit an optical signal pulse;
   an intensity and polarization modulation module, an input terminal of the intensity and polarization modulation module being connected with an output terminal of the light source module to perform an intensity modulation and a polarization modulation on the optical signal pulse;
   a polarization maintaining interference ring, a first terminal of the polarization maintaining interference ring being connected with an output terminal of the intensity and polarization modulation module;
   a phase and intensity modulation module, an input terminal of the phase and intensity modulation module being connected with a third terminal of the polarization maintaining interference ring to perform a phase modulation and an intensity modulation on the optical signal pulse from the polarization maintaining interference ring;

a first isolator, an input terminal of the first isolator being connected with an output terminal of the phase and intensity modulation module;

a first polarization beam splitter, a first terminal of the first polarization beam splitter being connected with an output terminal of the first isolator;

a second isolator, an input terminal of the second isolator being connected with a third terminal of the first polarization beam splitter, and an output terminal of the second isolator being connected with a fourth terminal of the polarization maintaining interference ring;

a beam splitter, a first terminal of the beam splitter being connected with a second terminal of the first polarization beam splitter by a communication channel;

a second polarization beam splitter, a first terminal of the second polarization beam splitter being connected with a third terminal of the beam splitter;

a second phase modulator, a first terminal of the second phase modulator being connected with a second terminal of the second polarization beam splitter; and a 90-degree Faraday rotator mirror, a first terminal of the 90-degree Faraday rotator mirror being connected with a second terminal of the second phase modulator, and a second terminal of the 90-degree Faraday rotation mirror being connected with a third terminal of the second polarization beam splitter.

2. The optical path system for quantum communication according to claim 1, further comprising a first single photon detector connected with a second terminal of the polarization maintaining interference ring.

3. The optical path system for quantum communication according to claim 1, further comprising a second single photon detector connected with a second terminal of the beam splitter.

4. The optical path system for quantum communication according to claim 1, further comprising an optical circulator, wherein a first terminal of the optical circulator is connected with the output terminal of the intensity and polarization modulation module, and a second terminal of the optical circulator is connected with the first terminal of the polarization maintaining interference ring.

5. The optical path system for quantum communication according to claim 4, further comprising a third single photon detector connected with a third terminal of the optical circulator.

6. The optical path system for quantum communication according to claim 4, wherein the intensity and polarization modulation module comprises:

a variable optical attenuator, an input terminal of the variable optical attenuator being connected with the output terminal of the light source module;

a polarization modulator, an input terminal of the polarization modulator being connected with an output terminal of the variable optical attenuator; and a third polarization beam splitter, an input terminal of the third polarization beam splitter being connected with an output terminal of the polarization modulator, and an output terminal of the third polarization beam splitter being connected with the first terminal of the optical circulator.

7. The optical path system for quantum communication according to claim 1, wherein: the phase and intensity modulation module comprises a first phase modulator; an input terminal of the first phase modulator is connected with the third terminal of the polarization maintaining interference ring; and an output terminal of the first phase modulator is connected with the input terminal of the first isolator.

8. The optical path system for quantum communication according to claim 7, wherein: the phase and intensity modulation module further comprises an intensity modulator; an input terminal of the intensity modulator is connected with the output terminal of the first phase modulator; and an output terminal of the intensity modulator is connected with the input terminal of the first isolator.

9. The optical path system for quantum communication according to claim 1, further comprising a polarization maintaining optical fiber, wherein:

the light source module, the intensity and polarization modulation module, the polarization maintaining interference ring, the phase and intensity modulation module, the first isolator and the first polarization beam splitter are connected by the polarization maintaining optical fiber.

10. A quantum communication method, comprising:

providing, by a receiving end, an optical signal pulse, and performing an intensity modulation and a polarization modulation on the optical signal pulse;

dividing an intensity modulated and polarization modulated optical signal pulse into a first optical signal pulse and a second optical signal pulse, the second optical signal pulse having a time delay with respect to the first optical signal pulse;

performing phase modulations and intensity modulations on the first optical signal pulse and the second optical signal pulse, respectively, and transmitting phase modulated and intensity modulated first optical signal pulse and second optical signal pulse to a transmitting end via a communication channel;

dividing the first optical signal pulse transmitted to the transmitting end into a first detection optical signal and a second optical signal, and dividing the second optical signal pulse transmitted to the transmitting end into a third detection optical signal and a fourth optical signal;

performing a safety detection based on the first detection optical signal, and dividing the second optical signal into two second sub-optical signals;

performing a safety detection based on the third detection optical signal, and dividing the fourth optical signal into two fourth sub-optical signals;

sequentially performing a phase modulation and a 90-degree polarization state rotation on one of the two second sub-optical signals to form a first sub-detection optical signal; sequentially performing a 90-degree polarization state rotation and a phase modulation on another of the two second sub-optical signals to form a second sub-detection optical signal; and combining the first sub-detection optical signal and the second sub-detection optical signal to form a first detection optical signal pulse;

sequentially performing a phase modulation and a 90-degree polarization state rotation on one of the two fourth sub-optical signals to form a third sub-detection optical signal; sequentially performing a 90-degree polarization state rotation and a phase modulation on another of the fourth sub-optical signals to form a fourth sub-detection optical signal; and combining the third sub-detection optical signal and the fourth sub-detection optical signal to form a second detection optical signal pulse; and transmitting the first detection optical signal pulse and the second detection optical signal pulse to the receiving end via the communication channel for detection, and decoding phase codes of the transmitting end.

11. The quantum communication method according to claim 10, wherein, performing the intensity modulations on the first optical signal pulse and the second optical signal pulse, respectively, comprises:
eliminating the first optical signal pulse, and keeping the second optical signal pulse unchanged.

12. The quantum communication method according to claim 10, wherein, performing the intensity modulations on the first optical signal pulse and the second optical signal pulse, respectively, comprises:
keeping the first optical signal pulse unchanged, and eliminating the second optical signal pulse.

13. The quantum communication method according to claim 10, wherein, performing the intensity modulations on the first optical signal pulse and the second optical signal pulse, respectively, comprises:
eliminating an intensity of the first optical signal pulse by half, and eliminating an intensity of the second optical signal pulse by half.

14. The quantum communication method according to claim 10, wherein, performing the phase modulations on the first optical signal pulse and the second optical signal pulse, respectively, comprises:
keeping a phase of the second optical signal pulse unchanged.

15. The quantum communication method according to claim 10, wherein, performing the phase modulations on the first optical signal pulse and the second optical signal pulse, respectively, comprises:
changing a phase of the first optical signal pulse by $\Pi$.

16. The quantum communication method according to claim 10, wherein, performing the phase modulations on the first optical signal pulse and the second optical signal pulse, respectively, comprises:
changing a phase of the second optical signal pulse by $\Pi$.

17. The quantum communication method according to claim 10, wherein, performing phase modulations on the two second sub-optical signals comprises:
keeping a phase of each of the two second sub-optical signals unchanged.

18. The quantum communication method according to claim 10, wherein, performing phase modulations on the two second sub-optical signals comprises:
changing a phase of each of the two second sub-optical signals by $\Pi$.

19. The quantum communication method according to claim 10, wherein, performing phase modulations on the two fourth sub-optical signals comprises:
keeping a phase of each of the two fourth sub-optical signals unchanged.

20. The quantum communication method according to claim 10, wherein, performing phase modulations on the two fourth sub-optical signals comprises:
changing a phase of each of the two fourth sub-optical signals by $\Pi$.

* * * * *